(12) United States Patent　　(10) Patent No.: US 12,613,508 B2
Kumar et al.　　(45) Date of Patent: Apr. 28, 2026

(54) REAL-TIME ANOMALY DETECTION IN THREE DIMENSIONAL PRINTERS

(71) Applicant: Peridot Print LLC, Palo Alto, CA (US)

(72) Inventors: Amit Kumar, Bangalore (IN); Hariharan Rajaram, Bangalore (IN); Debjit Roy, Bangalore (IN); Prakash Reddy, Palo Alto, CA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 409 days.

(21) Appl. No.: 18/023,838

(22) PCT Filed: Aug. 28, 2020

(86) PCT No.: PCT/US2020/048390
§ 371 (c)(1),
(2) Date: Feb. 28, 2023

(87) PCT Pub. No.: WO2022/046073
PCT Pub. Date: Mar. 3, 2022

(65) Prior Publication Data
US 2023/0315048 A1　　Oct. 5, 2023

(51) Int. Cl.
*G05B 19/4099*　　(2006.01)

(52) U.S. Cl.
CPC .................... *G05B 19/4099* (2013.01); *G05B 2219/49023* (2013.01)

(58) Field of Classification Search
CPC ...... G05B 19/4099; G05B 2219/49023; B33Y 10/00; B33Y 50/02; B22F 10/85; B22F 12/90; G06F 2113/10; G06F 2119/18; G06F 30/27; G06N 3/04; G06N 3/045; G06N 3/08
See application file for complete search history.

(56) References Cited

U.S. PATENT DOCUMENTS

| | | | |
|---|---|---|---|
| 10,265,911 B1 | 4/2019 | Capri et al. | |
| 10,432,800 B1 | 10/2019 | Bae | |
| 10,504,023 B1 * | 12/2019 | Bengio | .................... G06N 3/08 |
| 10,635,085 B2 | 4/2020 | Berlier et al. | |
| 2017/0144378 A1 | 5/2017 | Giera | |

(Continued)

FOREIGN PATENT DOCUMENTS

| | | | | |
|---|---|---|---|---|
| EP | 3646968 A1 * | 5/2020 | ............. | B33Y 50/02 |

OTHER PUBLICATIONS

Zhang J, Wang P, Gao RX. Attention mechanism-incorporated deep learning for AM part quality prediction. Procedia CIRP. Jan. 1, 2020;93:96-101. (Year: 2020).*

(Continued)

*Primary Examiner* — Alicia M. Choi
(74) *Attorney, Agent, or Firm* — Michael Dryja

(57) ABSTRACT

Examples of systems for detecting anomaly in a print job performed by a three-dimensional printer are described herein. In an example, a data set pertaining to a set of layers printed based on a print job of the 3D printer may be processed by an anomaly detection engine. Thereafter, a data set of a layer being printed by the 3D printer may be obtained. Based on the data set of the set of layers and the data set of the layer being printed, an anomaly may be detected in real-time.

15 Claims, 6 Drawing Sheets

(56)   References Cited

U.S. PATENT DOCUMENTS

| | | | |
|---|---|---|---|
| 2018/0281285 A1 | 10/2018 | Morovic et al. | |
| 2018/0314234 A1 | 11/2018 | Zhang et al. | |
| 2019/0227897 A1* | 7/2019 | Sinclair | G06F 11/3006 |
| 2020/0033270 A1* | 1/2020 | Wynne | B33Y 10/00 |
| 2020/0096970 A1 | 3/2020 | Mehr et al. | |
| 2020/0114584 A1 | 4/2020 | Marsch et al. | |
| 2020/0147868 A1 | 5/2020 | Gold | |
| 2020/0160497 A1 | 5/2020 | Shah et al. | |
| 2020/0166909 A1* | 5/2020 | Noone | G06N 20/00 |
| 2020/0174748 A1* | 6/2020 | Roberts | G06F 7/22 |
| 2020/0230884 A1* | 7/2020 | Buggenthin | B29C 64/386 |
| 2020/0255955 A1* | 8/2020 | Desai | C23F 1/02 |
| 2020/0307101 A1* | 10/2020 | Schultz | B29C 64/393 |
| 2020/0398485 A1* | 12/2020 | Cambron | B22F 12/55 |
| 2021/0178697 A1* | 6/2021 | Nilakantan | G06Q 10/06 |
| 2021/0387421 A1* | 12/2021 | Putman | B22F 10/20 |
| 2022/0187847 A1* | 6/2022 | Cella | G05B 19/41885 |
| 2024/0142941 A1* | 5/2024 | Mehr | G05B 19/4099 |

OTHER PUBLICATIONS

Y. Tan et al., An Encoder-Decoder Based Approach for Anomaly Detection with Application in Additive Manufacturing, 2019 18th IEEE International Conference On Machine Learning And Applications (ICMLA), Boca Raton, FL, USA, 2019, pp. 1008-1015. (Year: 2019).*

* cited by examiner

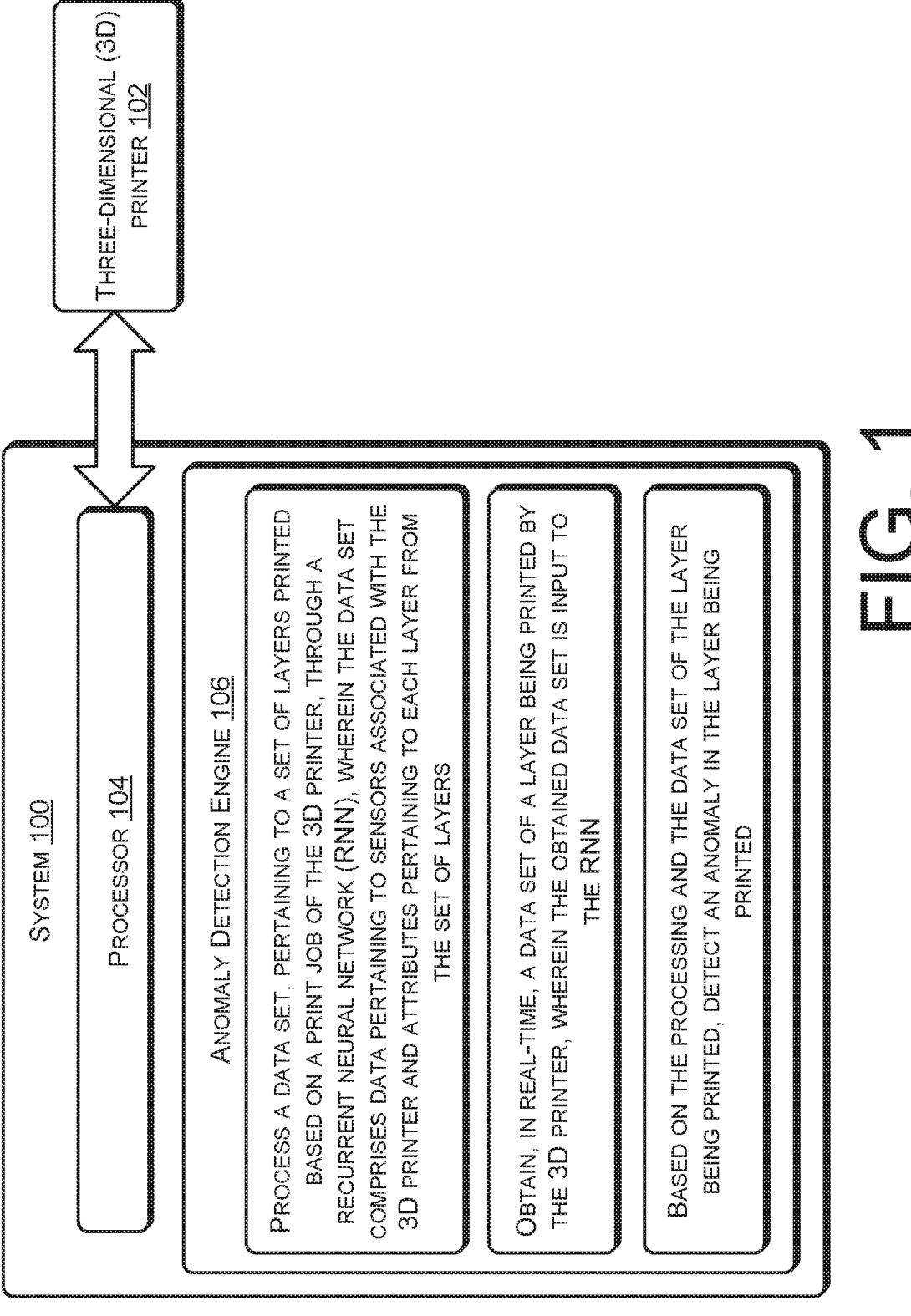

THREE-DIMENSIONAL (3D) PRINTER 102

SYSTEM 100

PROCESSOR 104

ANOMALY DETECTION ENGINE 106

PROCESS A DATA SET, PERTAINING TO A SET OF LAYERS PRINTED BASED ON A PRINT JOB OF THE 3D PRINTER, THROUGH A RECURRENT NEURAL NETWORK (RNN), WHEREIN THE DATA SET COMPRISES DATA PERTAINING TO SENSORS ASSOCIATED WITH THE 3D PRINTER AND ATTRIBUTES PERTAINING TO EACH LAYER FROM THE SET OF LAYERS

OBTAIN, IN REAL-TIME, A DATA SET OF A LAYER BEING PRINTED BY THE 3D PRINTER, WHEREIN THE OBTAINED DATA SET IS INPUT TO THE RNN

BASED ON THE PROCESSING AND THE DATA SET OF THE LAYER BEING PRINTED, DETECT AN ANOMALY IN THE LAYER BEING PRINTED

FIG. 1

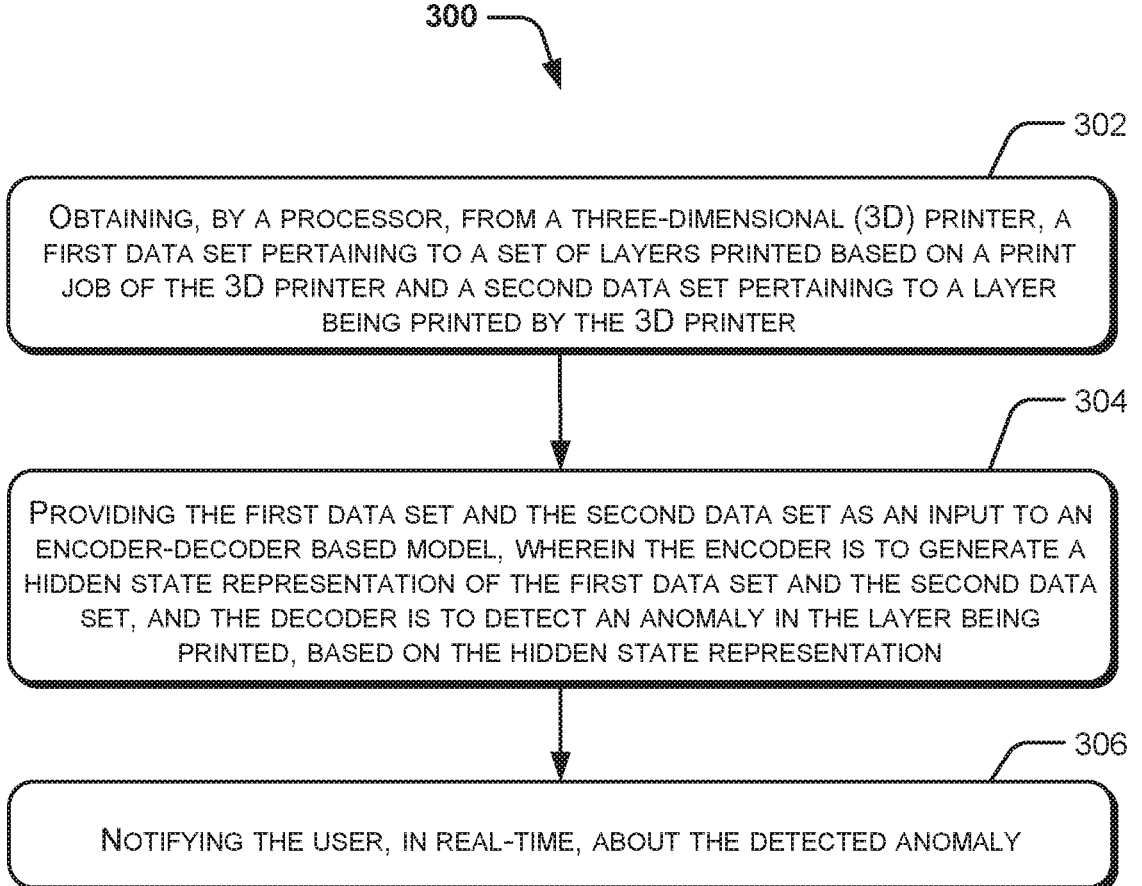

300

302

OBTAINING, BY A PROCESSOR, FROM A THREE-DIMENSIONAL (3D) PRINTER, A FIRST DATA SET PERTAINING TO A SET OF LAYERS PRINTED BASED ON A PRINT JOB OF THE 3D PRINTER AND A SECOND DATA SET PERTAINING TO A LAYER BEING PRINTED BY THE 3D PRINTER

304

PROVIDING THE FIRST DATA SET AND THE SECOND DATA SET AS AN INPUT TO AN ENCODER-DECODER BASED MODEL, WHEREIN THE ENCODER IS TO GENERATE A HIDDEN STATE REPRESENTATION OF THE FIRST DATA SET AND THE SECOND DATA SET, AND THE DECODER IS TO DETECT AN ANOMALY IN THE LAYER BEING PRINTED, BASED ON THE HIDDEN STATE REPRESENTATION

306

NOTIFYING THE USER, IN REAL-TIME, ABOUT THE DETECTED ANOMALY

OBTAINING A FIRST DATA SET PERTAINING TO A SET OF LAYERS PRINTED BASED ON A PRINT JOB OF THE 3D PRINTER

404

PROVIDING THE FIRST DATA SET AS AN INPUT TO AN ENCODER-DECODER BASED MODEL

406

RECONSTRUCTING A SECOND DATA SET FOR A LAYER BEING PRINTED BY THE 3D PRINTER

408

OBTAINING, IN REAL-TIME, A SECOND DATA SET PERTAINING TO THE LAYER BEING PRINTED BY THE 3D PRINTER

A

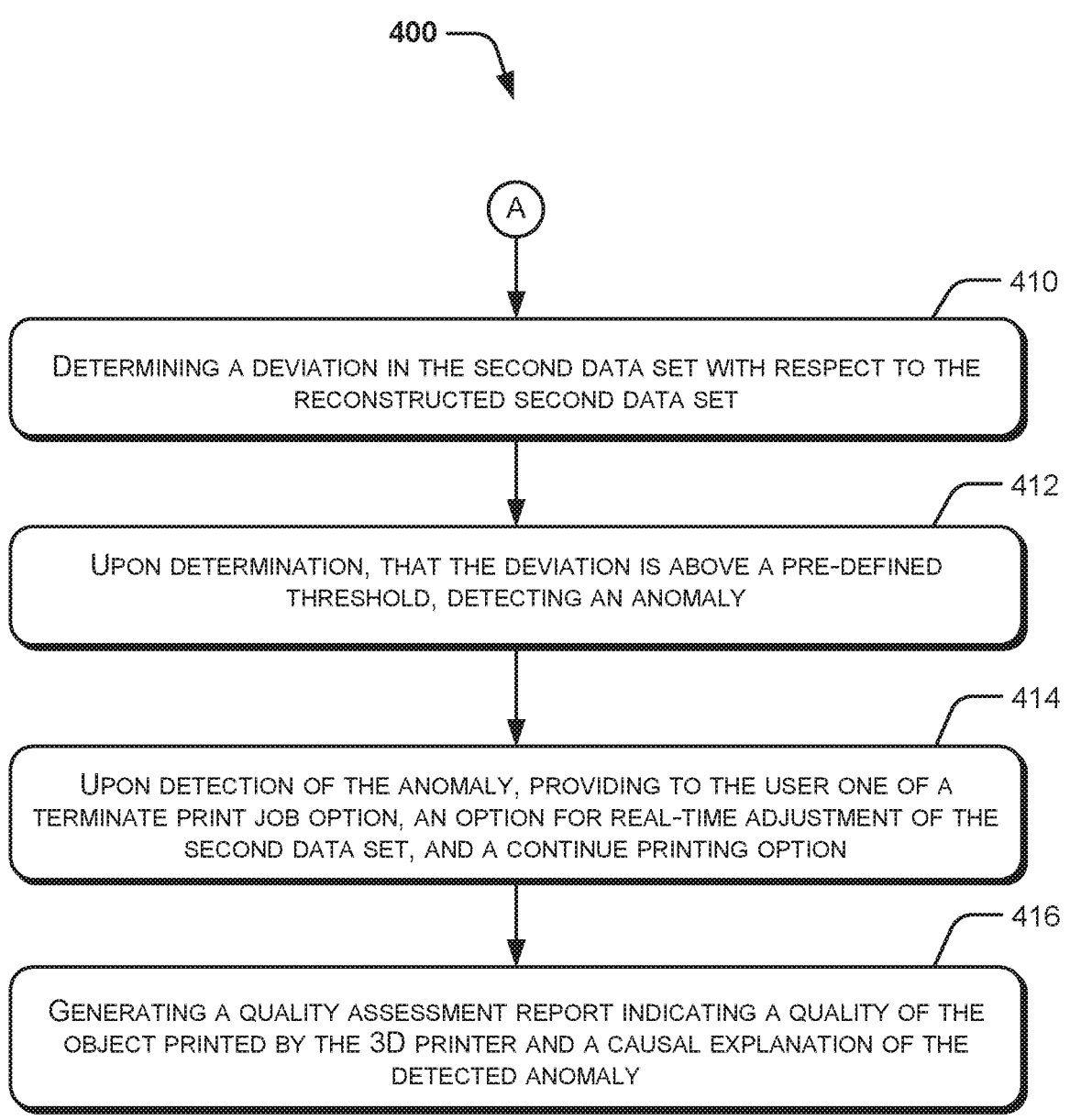

400

Ⓐ

410

DETERMINING A DEVIATION IN THE SECOND DATA SET WITH RESPECT TO THE RECONSTRUCTED SECOND DATA SET

412

UPON DETERMINATION, THAT THE DEVIATION IS ABOVE A PRE-DEFINED THRESHOLD, DETECTING AN ANOMALY

414

UPON DETECTION OF THE ANOMALY, PROVIDING TO THE USER ONE OF A TERMINATE PRINT JOB OPTION, AN OPTION FOR REAL-TIME ADJUSTMENT OF THE SECOND DATA SET, AND A CONTINUE PRINTING OPTION

416

GENERATING A QUALITY ASSESSMENT REPORT INDICATING A QUALITY OF THE OBJECT PRINTED BY THE 3D PRINTER AND A CAUSAL EXPLANATION OF THE DETECTED ANOMALY

FIG. 4B

REAL-TIME ANOMALY DETECTION IN THREE DIMENSIONAL PRINTERS

BACKGROUND

Three-dimensional (3D) printers perform 3D printing to fabricate a 3D object or any 3D part of the 3D object. The 3D printing may be accomplished through additive processes in which successive layers of material are laid down one on top of each other. The 3D printers may utilize nozzles or orifices for extruding a material onto a work area and perform treatment of the deposited material to form a desired layer.

BRIEF DESCRIPTION OF FIGURES

The detailed description is provided with reference to the accompanying figures, wherein:

FIG. 1 illustrates a system for detecting anomaly in a print job performed by a three-dimensional printer, according to an example;

FIG. 3 illustrates a method for detecting anomaly in a print job performed by a three-dimensional printer, according to an example;

FIGS. 4A and 4B illustrate a method for detecting anomaly in a print job performed by a three-dimensional printer, according to an example.

DETAILED DESCRIPTION

Figure 2:
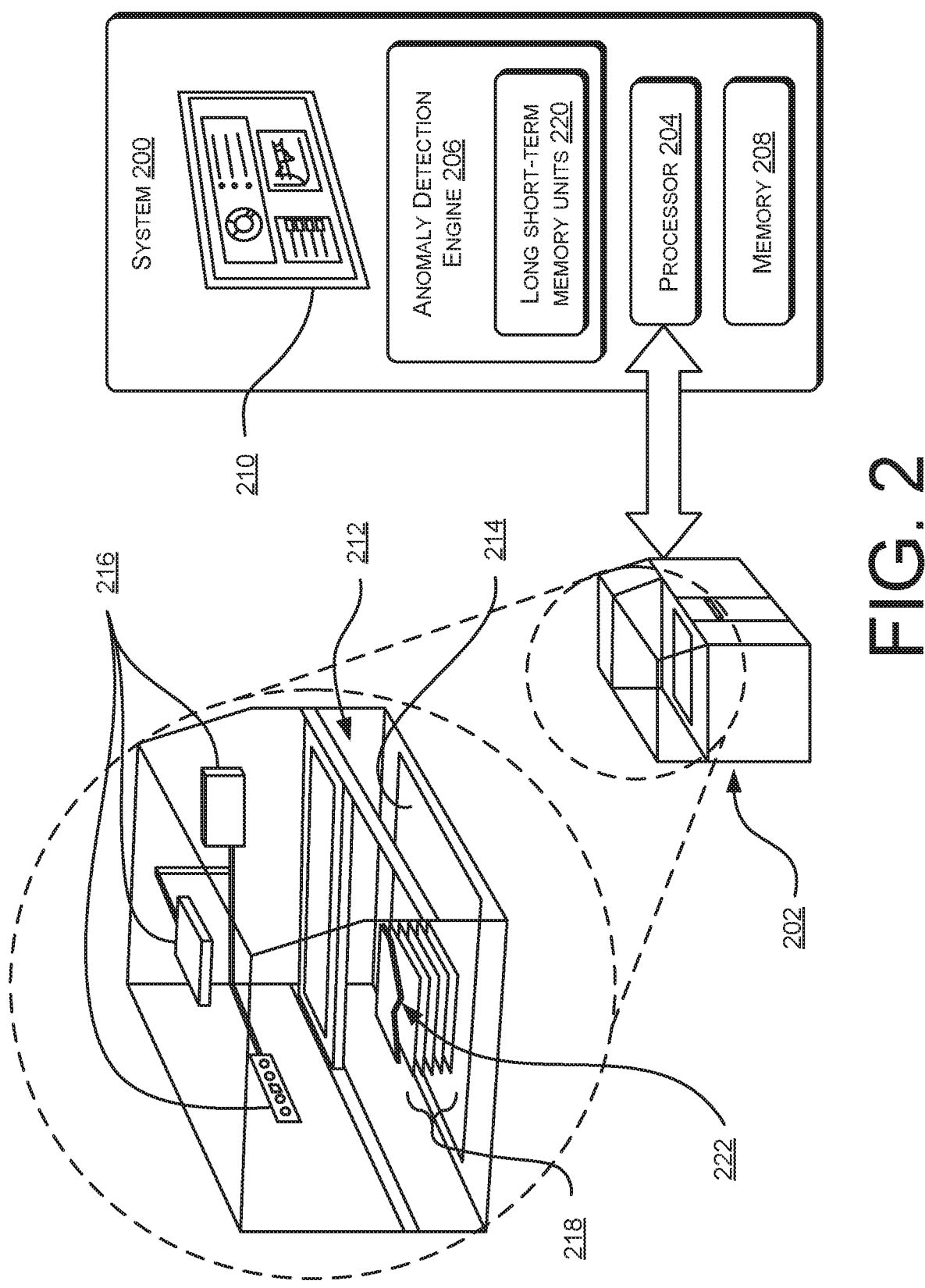
FIG. 2 illustrates a system for detecting anomaly in a print job performed by a three-dimensional printer, according to an example.

Three-dimensional (3D) printers may be employed in applications such as, prototype manufacturing and industrial-production technologies. The 3D printers may sequential deposit a material onto a material bed of the 3D printer to fabricate a prototype or a 3D object or a 3D part. In a 3D printing process, a first material-layer is formed, and thereafter, successive material-layers (or parts thereof) are added one by one, wherein each new material-layer is added on a pre-formed material-layer, until completely designed 3D object or 3D part is fabricated.

Such layer-by-layer printing may involve interactions among a plurality of printing parameters, including, but not limited to, physical properties of a print material, ambient humidity, ambient temperature, and a mixing ratio of the material. Any change in the interactions of the printing parameters may cause deviation in layer properties, and thus, resulting in anomalies in layers as well as the 3D object. Once the 3D object or the 3D part is printed, quality of the 3D printed part/object is assessed by performing different tests. For example, the 3D printed object or part is subjected to a look and feel test, dimensional accuracy test, mechanical strength test, and so on.

Nevertheless, these different tests may be insufficient to provide a causal explanation of any anomaly in the 3D printed object or 3D printed part. As a result, domain experts may have to manually check the 3D printed object or 3D printed part to determine a root cause of any detected anomaly. The quality assessment of the 3D printed object or the 3D printed part therefore becomes a time-consuming and cumbersome task.

The present subject matter discloses example approaches for detecting anomalies in a print job performed by a 3D printer. For example, the present subject matter may detect anomalies in real-time in the layers being printed by the 3D printer, thereby reducing wastage of raw material used for printing.

As per the present subject matter, a data set pertaining to a print job to be performed or being performed by the 3D printer may be received, such as by a system coupled to the 3D printer. The data set may belong to a set of layers printed by the 3D printer. For example, the data set may pertain to sensors employed in the 3D printer and attributes of the layers. The set of layers may include one layer or multiple layers or may include data from the 3D printer prior to commencement of the print job. The data set may be provided to a machine learned recurrent neural network (RNN) model. The RNN model may include long short-term memory (LSTM) units for retaining a comprehensive summary of the data set.

Based on the comprehensive summary of the data set, the RNN model may predict a printing behavior of the 3D printer and may reconstruct a data set pertaining to each layer being printed by the 3D printer. Thereafter, an actual data set associated with the layer being printed may be fetched from the 3D printer and compared with the reconstructed data set. The RNN model may determine a deviation in the two data sets and when the deviation may exceed a pre-defined threshold value, the system may notify, in real-time, a user of the 3D printer about a detected anomaly.

Accordingly, the present subject matter facilitates in detecting anomalies, in form of layer quality degradation in real-time during the 3D printing process. This may allow an operator to decide whether to terminate the print job or to manipulate the printing parameters to prevent quality degradation of the layers. In addition, the real-time anomaly detection may reduce raw material wastage, thereby being cost-efficient.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

The manner in which the systems and methods are implemented are explained in detail with respect to FIGS. 1-5. While aspects of described systems and methods can be implemented in any number of different electronic devices, environments, and/or implementations, the examples are described in the context of the following system(s). It is to be noted that drawings of the present subject matter shown here are for illustrative purposes and are not drawn to scale.

FIG. 1 illustrates a system 100 for detecting anomaly in a print job performed by a 3D printer 102, according to an example. The system 100 may be communicatively coupled to the 3D printer 102. The 3D printer 102 may manufacture a 3D solid object from a digital file. Examples of the 3D printer 102 may include, but are not limited to, a fused deposition modeling (FDM) printer, a multi jet fusion (MJF) printer, and a selective laser sintering (SLS) printer.

Examples of the system 100 may include, but are not limited to, a laptop, a notebook computer, a desktop computer.

The system 100 may include a processor 104 that may be communicatively coupled to the 3D printer 102. In an example, the processor 104 may be directly or remotely coupled to the 3D printer 102. The processor 104 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labelled as "processor(s)", may be provided through the use of dedicated hardware as well as hardware capable of executing computer-readable instructions.

Further, the system 100 may include an anomaly detection engine 106 coupled to the processor 104. The anomaly detection engine 106 may be implemented as a combination of hardware and programming, for example, programmable instructions to implement a variety of functionalities of the anomaly detection engine 106. In examples described herein, such combinations of hardware and programming may be implemented in several different ways. For example, the programming for the anomaly detection engine 106 may be executable instructions. Such instructions may be stored on a non-transitory machine-readable storage medium which may be coupled either directly with the system 100 or indirectly (for example, through networked means). In the present examples, the non-transitory machine-readable storage medium may store instructions that, when executed by the processor, implement anomaly detection engine 106. In other examples, the anomaly detection engine 106 may be implemented as electronic circuitry.

The anomaly detection engine 106, amongst other things, include routines, programs, objects, components, and data structures, which perform particular tasks or implement particular abstract data types. The anomaly detection engine 106 may also be implemented as, signal processor(s), state machine(s), logic circuitries, and/or any other device or component that manipulates signals based on operational instructions. Further, the anomaly detection engine 106 can be implemented by hardware, by computer-readable instructions executed by a processing unit, or by a combination thereof.

In an example, the anomaly detection engine 106 may process a data set through a recurrent neural network. The data set may, pertain to a set of layers printed based on a print job of the 3D printer 102. In an example, the set of layers may be pre-defined and may include one layer or multiple layers. The data set may indicate operating parameters associated with the print job, such as data pertaining to various sensors associated with the 3D printer. In addition, the data set may include attributes pertaining to each layer, such as ink density. In an example, the data set may also pertain to an initialization phase in which the 3D printer 102 is getting ready to print and an actual print job has not started.

In the present example, the anomaly detection engine 106 may be a machine learned model that may process the data set to generate a summary of the data set. Based on the summary, the anomaly detection engine 106 may reconstruct a data set for a next layer that is being printed by the 3D printer 102.

Further, the anomaly detection engine 106 may obtain, in real-time, a data set of a layer being printed by the 3D printer 102. The anomaly detection engine 106 may input the obtained data set to the RNN. Based on the reconstructed data set and the data set obtained from the 3D printer, the anomaly detection engine 106 may detect an anomaly in the layer being printed.

Accordingly, the system 100 employs deep learning to simulate a normal behaviour of the 3D printer 102. Based on the simulation, the system 100 may detect, in-real time, anomalies associated with a layer being printed by the 3D printer 102. This may avoid any wastage of print materiel as a user may take appropriate actions based on the knowledge that the anomaly has been detected.

FIG. 2 illustrates a system 200 for detecting anomaly in a print job performed by a 3D printer 202, according to an example. The system 200 may be similar to the system 100. The system 200 may include a processor 204 and an anomaly detection engine 206. The processor 204 and the anomaly detection engine 206 may be similar to the processor 104 and the anomaly detection engine 106.

Further, the system 200 may include a memory 208. The memory 208 may include any non-transitory computer-readable medium including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

In an example, the system 200 may include interface(s) 210. The interface(s) 210 may include a variety of interfaces, for example, interface(s) 210 for users. The interface(s) 210 may include data output devices. The interface(s) 210 may facilitate the communication of the system 200 with various communication and electronic devices, such as the 3D printer 202.

In an example, the 3D printer 202 may be a multi-jet fusion (MJF) 3D printer. The MJF 3D printer may use an inkjet array to selectively apply fusing agent and detailing agent across a bed of powdered material, which are then fused by heating elements into a solid layer. The 3D printer 202 may include a thermal chamber 212 having a print bed 214 on which a plurality of layers may get printed in response to a print job of the 3D printer 202. Further, the 3D printer 202 may include a plurality of sensors 216, such as humidity sensors, ambient temperature sensors, printhead sensors, thermal chamber pressure sensors, carriage pressure sensors, and so on.

In an example, a humidity sensor may be placed in a work area of the 3D printer 202. The work area may be the area in which the print bed 214 of the 3D printer 202 is present. The humidity sensor may measure humidity of the work area before a printing process of the 3D printer 202 is started or during the printing process. In another example, an ambient temperature sensor may be placed in the work area to measure the ambient temperature of the work area. Further, the print head sensors may include a temperature sensor to measure temperature of a printhead during the printing process. In an example, the thermal chamber pressure sensors may be placed in the thermal chamber 212 to measure air pressure inside the thermal chamber 212. In another example, a carriage pressure sensor may be placed in the work area in connection with a carriage which movably carries an inkjet array above the print bed 214. The carriage pressure sensor may measure a pressure being applied on the carriage during the printing process.

In an example, the anomaly detection engine 206 may communicate with the processor 204 to obtain a data set pertaining to a set of layers 218 printed by the 3D printer 202. In the present example, the data set may include sensor data pertaining to the plurality of sensors 216. In addition, the data set may include layer data pertaining to the attributes of layers that may be printed. Examples of the layer data may include, but are not limited to, layer density data, fusing agent data, detailing agent data, z position of the layer, and so on. In an example, the fusing agent data may be a volume of a fusing agent used while printing a particular layer. The fusing agent may facilitate in fusing together a layer of powder (raw material). In another example, the detailing agent data may be a volume of a detailing agent that may be employed to enhance part resolution. In an example, the Z position denotes how far a layer is from a first layer in a vertical direction. Further, the layer density data may indicate how compact or dense a layer is. In an example, the set of layers may include one layer or multiple layers that have been printed by the 3D printer 202.

In an example, the data set containing the layer data and the sensor data may be pre-processed before being provided to the anomaly detection engine 206. For example, the data set may be normalized using standard normal distribution. The standard normal distribution may include a mean as zero and a standard deviation as one.

In an example implementation, the anomaly detection engine 206 may include an encoder-decoder based deep learning architecture to detect an anomaly in the layer being printed. The encoder-decoder based deep learning architecture is trained using successfully completed print jobs. For example, the encoder-decoder based deep learning architecture is trained for a predefined set of layers, such as last 10 layers printed, over about 0.4 million sequence records, where each sequence record contains eight layer attributes and 40 sensor data. For example, the encoder-decoder based deep learning architecture may include long short-term memory (LSTM) units 220. The LSTM units 220 remember past data by generating a comprehensive summary of sequence in the form of last hidden state representation in reduced dimensional space. The LSTM units 220 of the encoder may summarize a sequence keeping salient information of all previous layers in the sequence. Based on the summary, the decoder may reconstruct the sequence from the last hidden state representation. Any gradient in the reconstructed sequence with respect to an actual sequence may be considered as a reconstruction error. During training of the anomaly detection engine 206, the reconstruction error is minimized by using an optimization technique, such as Gradient Descent.

When the anomaly detection engine 206 is implemented in the system 200, the anomaly detection engine 206 may obtain the data set pertaining to the set of layers 218 printed based on a print job of the 3D printer 202. Based on data set of the set of layers 218, the encoder of the anomaly detection engine 206 may generate a hidden state representation of the data set. Thereafter, the decoder may reconstruct a data set for a layer 222 being printed by the 3D printer 202 based on the hidden state representation.

Thereafter, the anomaly detection engine 206 may obtain in real-time, an actual data set of the layer 222 being printed by the 3D printer 202. The anomaly detection engine 206 may compare the reconstructed data set with the actual data set for the layer 222 being printed. Based on the comparison, the anomaly detection engine 206 may identify a deviation between the actual data set and the reconstructed data set. In an example, the deviation may be identified as mean squared error. For example, the mean squared error may measure an average of squared of the errors, i.e., an average squared difference between the reconstructed data set and the actual data set for the layer 222.

If the deviation is below a predefined threshold value, the anomaly detection engine 206 may store the deviation in the memory 208. If the deviation is above a predefined threshold, the anomaly detection engine 206 may notify to a user that an anomaly has been detected in the layer 222 being printed. For example, the anomaly detection engine 206 may note the deviation in the data set as 0 or 1. The value of 1 denotes that the deviation has exceeded the threshold value and there may be maximum quality degradation in the layer being printed, whereas the value of 0 denotes that the deviation is within the threshold value and there may be a minor quality degradation in the layer being printed.

In an example, the anomaly detection engine 206 may generate, in real-time, a notification informing degradation in a layer quality associated with the print job of the 3D printer 202 to a user. For example, when the anomaly detection engine 206 observes deviation to have the value as 1, the anomaly detection engine 206 may generate a notification to inform the user about the anomaly. For example, the notification may be rendered on the interface(s) 210 to indicate a degradation in a quality of each layer that is being printed by the 3D printer 202. The interface(s) 210 may render graphs indicating anomalies or normal behavior in printed layers. The interface(s) 210 may also highlight relevant layer attributes and sensor data with respect to deviations in the data sets. The real-time quality assessment for each layer being printed may facilitate in preventing wastage of raw material used for the print job.

Such an indication may facilitate the user to abort the print job if the layer quality degradation is beyond an acceptable limit. Alternatively, the user may adjust, in real-time, the data set associated with a layer for which the layer quality has degraded, based on the notification generated by the anomaly detection engine 206. As a result, the user may minimize the layer quality degradation. For example, the anomaly detection engine 206 may provide a user with a terminate print job option or an option for real-time adjustment of the data set pertaining to the layer being printed or a continue printing option.

Further, once the print job is concluded, such as due to termination of the print job upon detection of the anomaly or upon completion of the print job, the anomaly detection engine 206 may generate a quality assessment report. The quality assessment report may be indicative of an overall quality of the print job which has been concluded. Based on the quality assessment report, quality testing of the 3D part/object fabricated as a result of the print job may be performed on.

In an example, the quality assessment report may provide a specific value to indicate an overall quality of the print job. A lower value may indicate a good quality of the 3D printed object or part thereof. In addition, the quality assessment report may indicate contribution of various sensors and layer attributes for the detected anomaly. For example, upon detection of the anomaly, the anomaly detection engine 206 may determine a root cause of the anomaly based on contribution of data pertaining to the sensors 216 associated with the 3D printer 202 and the attributes pertaining to each layer being printed.

Figure 4A:
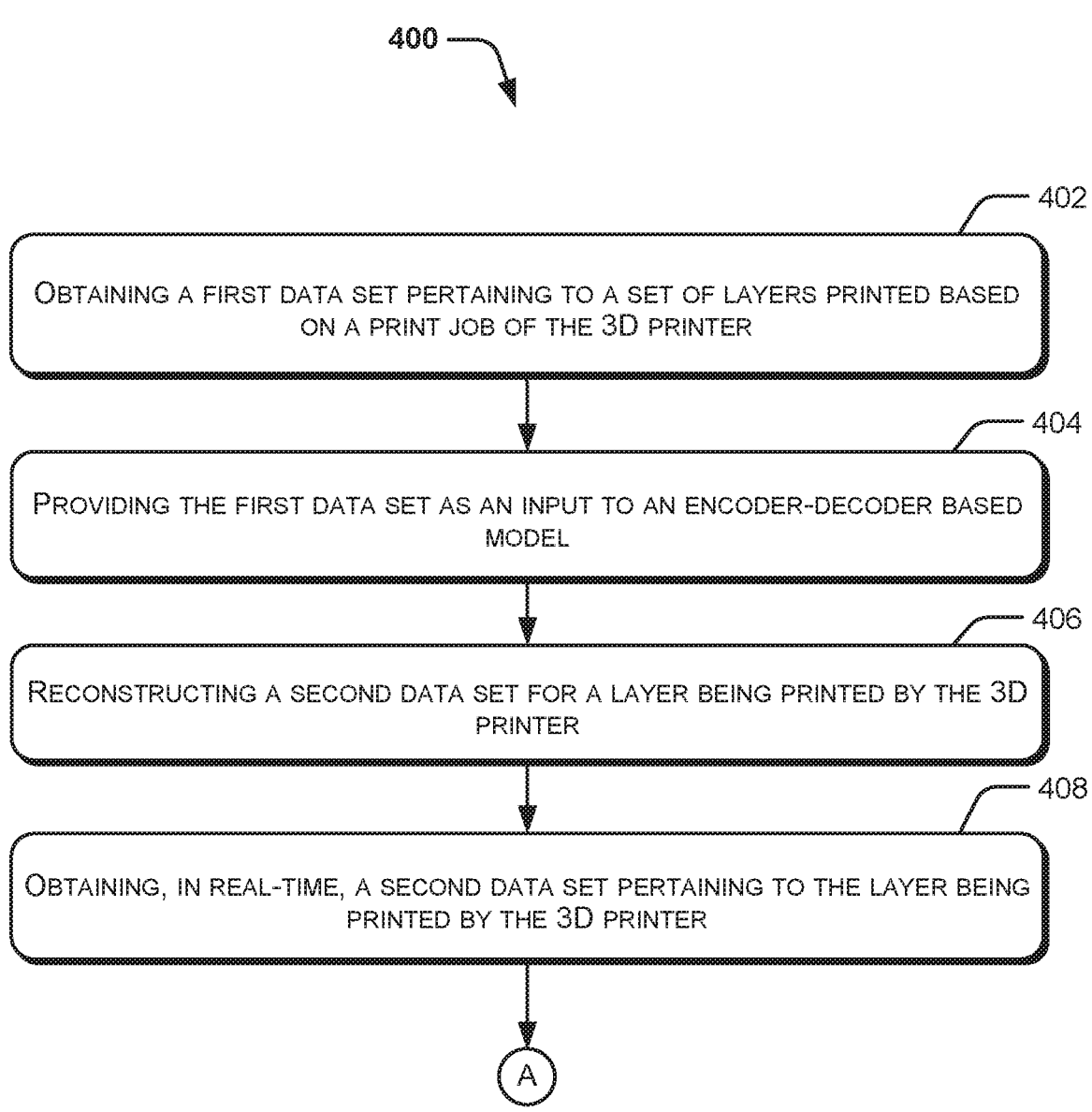

FIGS. 3, 4A, and 4B illustrate methods 300 and 400 for detecting anomaly in a print job performed by a three-dimensional (3D) printer, according to various examples. FIG. 4A describes various steps of the method 400 which is continued in FIG. 4B and therefore FIGS. 4A and 4B are to be considered as the same method. The 3D printer is similar to the 3D printer 102 which may fabricate a 3D object or a part of the 3D object based on the print job. The methods

300 and 400 can be implemented by processor(s) or device(s) through any suitable hardware, a non-transitory machine readable medium, or a combination thereof. Further, although the methods 300 and 400 are described in context of the system and the 3D printer that are similar to the aforementioned system 100 and the 3D printer 102, other suitable devices or systems may be used for execution of the methods 300 and 400.

In some examples, processes involved in the methods 300 and 400 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3, at block 302, a first data set, and a second data set may be obtained from the 3D printer. In an example, a processor (not shown) of the system may obtain the first data set and the second data set from the 3D printer. The first data set pertains to a set of layers printed based on the print job of the 3D printer. In an example implementation, the set of layers may be pre-defined. For example, the set of layers may include one layer or multiple layers. In addition, the second data set may pertain to a layer being printed by the 3D printer. Thus, the second data set may be obtained in real-time.

At block 304, the method 300 may include providing the first data set and the second data set as an input to an encode-decoder based model. In an example, the encoder-decoder based model may be a machine learned recurrent neural network (RNN) based model. The encoder may generate a hidden state representation of the first data set and the second data set. The hidden state representation may be indicative of a comprehensive summary of the first data set and the second data set.

Further, based on the hidden state representation generated by the encoder, the decoder may detect an anomaly in the layer being printed by the 3D printer. For example, based on the hidden state representation, the decoder may reconstruct a second data set for the layer being printed by the 3D printer. If the reconstructed second data set and the second data set obtained from the 3D printer indicates a mismatch, the decoder may detect the anomaly in the layer being printed.

In addition, at block 306, the method 300 may include notifying a user, in real-time, about the detected anomaly. In an example, the encoder-decoder based model may detect in real-time, the anomaly in the layer being printed by the 3D printer. Accordingly, the processor of the system may notify the user about the detected anomaly in real-time. Based on the notification, the user may either terminate the print job or may make corrections in the second data set to rectify or minimize the anomaly in the layer being printed.

The present subject matter therefore employs deep learning to detect real-time anomalies in the layers being printed by the 3D printer without conducting multiple tests, thereby saving time in detecting the anomalies.

Referring to FIGS. 4A and 4B, in an example implementation, at block 402, the method 400 may include obtaining a first data set pertaining to a set of layers printed based on a print job of the 3D printer. In an example, the first data set may include sensor data pertaining to a plurality of sensors deployed in the 3D printer. In addition, the first data set may include layer data pertaining to the attributes of layers that may be printed. Examples of the layer data may include, but are not limited to, layer density data, fusing agent data, detailing agent data, z position of the layer, and so on. In an example, the set of layers may include one layer or multiple layers that have been printed by the 3D printer. In another example implementation, the first data set may be indicative of data associated with the 3D printer during an initialization phase. In the initialization phase, the 3D printer may be getting ready to print and an actual print job may not have started.

At block 404, the method 400 may include providing the first data set as an input to the encoder-decoder based model. Based on the first data set, the encoder may generate a hidden state representation of the set of layers. The hidden state representation may include relevant information pertaining to the set of layers.

At block 406, the method 400 may include reconstructing a second data set for a layer being printed by the 3D printer. In an example, the decoder may reconstruct the second data set based in the hidden state representation of the first data set.

Thereafter, at block 408, the method 400 may include obtaining, in real-time, a second data set pertaining to the layer being printed by the 3D printer. In an example, a processor of the system may communicate with the 3D printer to obtain the second data set. The second data set may then be provided as an input to the encoder-decider based model.

As per block 410, the method 400 may include determining a deviation in the second data set obtained in real-time from the 3D printer with respect to the reconstructed second data set. For example, the decoder may compare the reconstructed second data set with the second data set obtained from the 3D printer. Based on the comparison, the decoder may identify a deviation in the second data set.

In case the deviation in the second data set and the reconstructed second data set is within a pre-defined threshold value; the system may store information pertaining to the deviation in a memory. For example, information pertaining to the deviation may include information about the parameters in which the deviation has been determined. When the deviation in the second data set and the reconstructed second data set is above the pre-defined threshold, the system may detect an anomaly in the layer associated with the second data set, i.e., the layer being printed, as per block 412.

At block 414, upon detection of the anomaly, providing to the user, one of a terminate print job option, an option for real-time adjustment of the second data set, and a continue print job option. In an example, the system may generate a notification in real-time to notify a user about degradation in a layer quality associated with the print job of the 3D printer. In addition to the notification, the system may provide the user with an option to take appropriate actions, such as terminate the print job to save the raw material or make changes in the data set associated with the layer being printed.

Further, at step 416, the method 400 may include generating a quality assessment report indicating a quality of the object printed by the 3D printer and a causal explanation of the detected anomaly. For example, upon completion or termination of the print job, the system may provide assessment of an overall quality of the 3D part or 3D object printed by the 3D printer.

Figure 5:
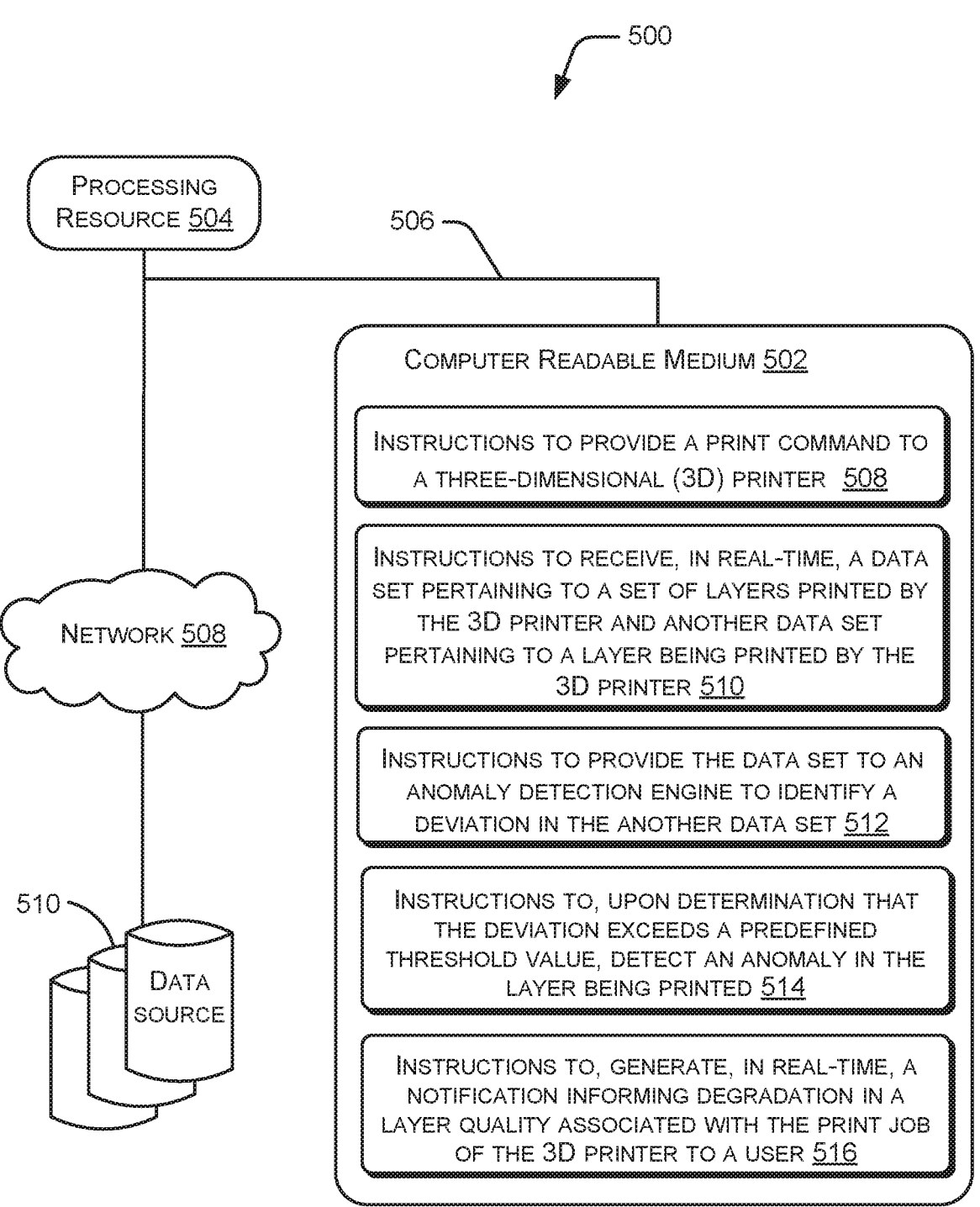
FIG. 5 illustrates a non-transitory computer readable medium for detecting anomaly in a print job performed by a three-dimensional printer, according to an example.

FIG. 5 illustrates an example system environment 500 using a non-transitory computer-readable medium 502 for detecting an anomaly in a print job performed by a three-dimensional (3D) printer, according to an example. The system environment 500 includes a processing resource 504 communicatively coupled to the non-transitory computer-readable medium 502 through a communication link 506.

For example, the processing resource 504 may be a processor of a system, such as the system communicating with the 3D printer, for fetching and executing computer-readable instructions from the non-transitory computer-readable medium 502.

The non-transitory computer-readable medium 502 may be, for example, an internal memory device or an external memory device. In one example, the communication link 506 may be a direct communication link, such as one formed through a memory read/write interface. In another example, the communication link 506 may be an indirect communication link, such as one formed through a network interface. In such a case, the processing resource 504 may access the non-transitory computer-readable medium 502 through a network (not shown).

In an example, the non-transitory computer-readable medium 502 includes a set of computer-readable and executable instructions for detecting an anomaly in a print job performed by a 3D printer. The set of computer-readable instructions may include instructions as explained in conjunction with FIGS. 1 to 4B. The set of computer-readable instructions, referred to as instructions hereinafter, may be accessed by the processing resource 504 through the communication link 506 and subsequently executed to perform acts for detecting an anomaly in a print job performed by the 3D printer.

Referring to FIG. 5, in an example, the non-transitory computer-readable medium may include instructions 508 to provide a print command to the 3D printer. In an example, the processing resource 504 may provide the print command indicating a print job for printing a 3D object or a part of a 3D object.

The non-transitory computer-readable medium 502 may also include instructions 510 to receive, in real-time, a data set pertaining to a set of layers printed by the 3D printer and another data set pertaining to a layer being printed by the 3D printer. In an example, the data set may include sensor data pertaining to a plurality of sensors deployed in the 3D printer. In addition, the data set may include layer data pertaining to the attributes of layers that may be printed. Examples of the layer data may include, but are not limited to, layer density data, fusing agent data, detailing agent data, z position of the layer, and so on. In an example, the set of layers may include one layer or multiple layers that have been printed by the 3D printer. In another example implementation, the data set may be indicative of data associated with the 3D printer during an initialization phase. In the initialization phase, the 3D printer may be getting ready to print and an actual print job may not have started.

The non-transitory computer-readable medium 502 may include instructions 512 to provide the data set to an anomaly detection engine to identify a deviation in the another data set. In an example, the anomaly detection engine may be trained over an encoder-decoder based recurrent neural network (RNN) to detect an anomaly in a layer being printed. The anomaly detection engine may be trained for a predefined set of layers, such as last 10 printed layers, over about 0.4 million sequence records, where each sequence record contains eight layer attributes and 40 sensor data. For example, the encoder-decoder based RNN may include long short-term memory (LSTM) units. The LSTM units may store past data by generating a comprehensive summary of sequence in the form of last hidden state representation in a reduced dimensional space.

The anomaly detection engine may obtain the data set pertaining to the set of layers printed based on the print job of the 3D printer. Based on data set, the encoder of the anomaly detection engine may generate a hidden state representation of the data set. Thereafter, the decoder may reconstruct a data set for a layer being printed by the 3D printer based on the hidden state representation.

In an example, the anomaly detection engine may compare the reconstructed data set with the another data set obtained for the layer being printed. Based on the comparison, the anomaly detection engine may identify a deviation between the another data set and the reconstructed data set.

Further, the non-transitory computer-readable medium 502 may include instructions 514 to detect an anomaly in the layer being printed, upon determination that the deviation exceeds a pre-defined threshold value. For example, when the deviation in the reconstructed data set and the another second data set is within a pre-defined threshold value, the processing resource 504 may store information pertaining to the deviation in a memory (not shown) of the system. Information pertaining to the deviation may include information about the parameters (sensors and layer attributes) in which the deviation has been determined. When the deviation in the reconstructed data set and the another second data set is above the pre-defined threshold value, the processing resource 504 may detect the anomaly in the layer associated with the another data set, i.e., the layer being printed.

In addition, the non-transitory computer-readable medium 502 may include instructions 516 to generate a notification, in real-time, to inform a user regarding a degradation in a layer quality associated with the print job of the 3D printer. Based on the notification, the user either decide to abort the print job or may make real-time adjustments in the data set associated with the layer being printed.

The non-transitory computer-readable medium 502 may also include instructions to generate a quality assessment report indicating a quality of the print job of the 3D printer and a causal explanation of the detected anomaly. For example, the quality assessment report may indicate a layer quality degradation of all layers printed by the 3D printer. For example, upon detection of the anomaly, the anomaly detection engine may determine a root cause of the anomaly based on contribution of the data pertaining to the sensors associated with the 3D printer and the attributes pertaining to each layer being printed. The causal explanation of the detected anomaly may be provided in the quality assessment report by indicating contribution of various sensors and layer attributes in the detected anomaly.

Although aspects for the present disclosure have been described in a language specific to structural features and/or methods, it is to be understood that the appended claims are not limited to the specific features or methods described herein. Rather, the specific features and methods are disclosed as examples of the present disclosure.

We claim:

1. A system comprising:

a processor communicatively coupled to a three-dimensional (3D) printer; and an anomaly detection engine, coupled to the processor, to:

receive a first data set pertaining to a set of previously printed layers based on a previous print job of the 3D printer, process the first data set through a recurrent neural network (RNN), wherein the first data set comprises data from sensors associated with the 3D printer and attributes pertaining to each layer from the set of previously printed layers;

cause the 3D printer to print a current print job;

obtain, in real-time, a second data set of a layer being printed by the 3D printer in the current print job; and input and process the second data set through the RNN to detect an anomaly in the layer being printed by the 3D printer.

2. The system as claimed in claim 1, wherein the anomaly detection engine is to calculate a deviation between the first data set and the second data set and determine the deviation between the first data set and the second data set exceeds a threshold value to detect the anomaly.

3. The system as claimed in claim 1, wherein the RNN comprises an encoder-decoder based deep learning architecture that comprises long short-term memory (LSTM) units to generate a summary of a sequence of the first data set obtained for the set of previously printed layers.

4. The system as claimed in claim 1, wherein in response to the detection of the anomaly, the anomaly detection engine is to generate, in real-time, a notification informing degradation in a layer quality associated with the current print job of the 3D printer to a user.

5. The system as claimed in claim 1, wherein the anomaly detection engine is to provide to a user one of a terminate print job option, an option for real-time adjustment of the second data set pertaining to the layer being printed in the current print job, and a continue printing option.

6. The system as claimed in claim 1, wherein upon detection of the anomaly, the anomaly detection engine is to determine a root cause of the anomaly based on contribution of data pertaining to the sensors associated with the 3D printer and the attributes pertaining to each layer being printed.

7. The system as claimed in claim 1, wherein the anomaly detection engine is to, in response to completion of the current print job of the 3D printer, generate a quality assessment report.

8. A method comprising:

causing, by a processor, a three-dimensional (3D) printer to print a current print job;

obtaining, by the processor, from the 3D printer, a first data set pertaining to a set of layers printed based on a previous print job of the 3D printer and a second data set pertaining to a layer being printed by the 3D printer in the current print job;

providing the first data set and the second data set as an input to an encoder-decoder based model, wherein an encoder is to generate a hidden state representation of the first data set and the second data set, and a decoder is to detect an anomaly in the layer being printed in the current print job; and notifying a user, in real-time, about the detected anomaly.

9. The method as claimed in claim 8, wherein the method comprises reconstructing, by the decoder, the second data set for the layer being printed, based on the first data set, prior to detecting the anomaly.

10. The method as claimed in claim 9, wherein the notifying comprises determining whether a deviation in the second data set with respect to a reconstructed second data set is above a predefined threshold value.

11. The method as claimed in claim 8, wherein the notifying comprises providing to the user one of a terminate print job option, an option for real-time adjustment of the second data set, and a continue printing option.

12. The method as claimed in claim 8, wherein the method comprises generating a quality assessment report indicating a quality of an object printed by the 3D printer and a causal explanation of the detected anomaly.

13. A non-transitory computer-readable medium comprising computer-readable instructions, which, when executed by a processing resource of a system, cause the processing resource to:

provide a print command to a three-dimensional (3D) printer to cause the 3D printer to print a current print job;

receive, a data set pertaining to a set of layers previously printed by the 3D printer in a previous print job, and another data set pertaining to a layer being printed by the 3D printer in the current print job;

provide the data set to an anomaly detection engine to identify a deviation in the another data set, the anomaly detection engine being trained over an encoder-decoder based recurrent neural network (RNN);

upon determination that the deviation exceeds above a predefined threshold value, detect an anomaly in the layer being printed by the 3D printer in the current print job; and generate, in real-time, a notification informing degradation in a layer quality associated with the current print job of the 3D printer.

14. The non-transitory computer-readable medium as claimed in claim 13, wherein the another data set is indicative of data pertaining to sensors associated with the 3D printer and attributes pertaining to each layer being printed.

15. The non-transitory computer-readable medium as claimed in claim 14, wherein upon detection of the anomaly, the anomaly detection engine is to determine a root cause of the anomaly based on contribution of the another data set pertaining to the sensors associated with the 3D printer and the attributes pertaining to each layer being printed.

* * * * *